United States Patent [19]

Lamphere et al.

[11] Patent Number: 4,774,272

[45] Date of Patent: Sep. 27, 1988

[54] COMPOSITE SHEET MATERIAL FOR STORAGE ENVELOPES FOR MAGNETIC RECORDING MEDIA

[75] Inventors: Craig F. Lamphere, Woodbury; Jeffry S. Shaw, Fridley; Leonard R. Swanson, Woodbury, all of Minn.

[73] Assignee: Minnesota Mining and Manufacturing Company, St. Paul, Minn.

[21] Appl. No.: 894,630

[22] Filed: Aug. 8, 1986

[51] Int. Cl.$^4$ .......................... B65D 5/50; B65D 5/52
[52] U.S. Cl. .................... 524/13; 162/157.2; 162/157.3; 162/157.4; 162/157.6; 162/162; 162/164.1; 162/164.6; 162/165; 162/166; 162/167; 206/44 R
[58] Field of Search ............ 524/13; 162/157.1, 157.2, 162/157.3, 157.4, 157.5, 157.6, 158, 162, 164.1, 164.6, 165, 166, 167; 206/444

[56] References Cited

U.S. PATENT DOCUMENTS 4,040,105  8/1977  Slindee ............................ 206/444
4,610,352  9/1986  Howey et al. .................... 206/444

FOREIGN PATENT DOCUMENTS 1000511  3/1983  U.S.S.R. ......................... 162/157.2

Primary Examiner—Delbert R. Phillips
Assistant Examiner—Nathan M. Nutter
Attorney, Agent, or Firm—Donald M. Sell; James A. Smith; Robert H. Jordan

[57] ABSTRACT

There is provided a composite sheet material for fabrication of storage envelopes for magnetic recording media, e.g., floppy diskettes. The material has a low debris count, and a fast rate of static decay as well as high stiffness and strength.

15 Claims, 1 Drawing Sheet

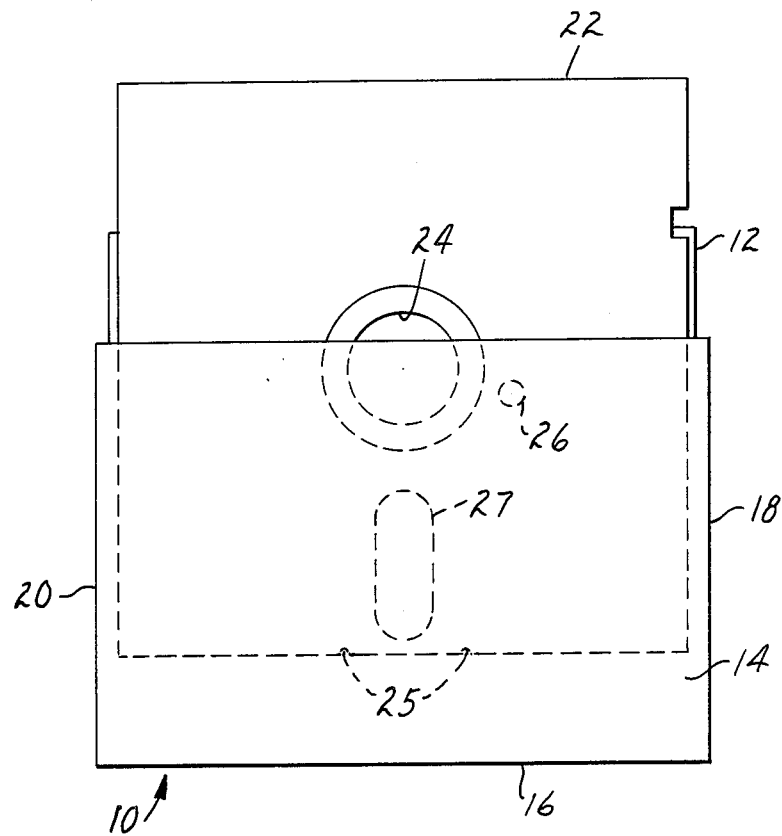

COMPOSITE SHEET MATERIAL FOR STORAGE ENVELOPES FOR MAGNETIC RECORDING MEDIA

FIELD OF INVENTION

This invention concerns storage envelopes for magnetic recording media, and more particularly, concerns a composite sheet material for such envelopes.

BACKGROUND

Flexible magnetic recording disks or diskettes, e.g., "floppy disks", are typically permanently encased in plastic jackets made from, e.g., polyvinyl chloride or polyester, and having a nonabrasive liner. Because these flexible disks are susceptible to exposure to magnetic fields or static electricity, dust and dirt, and are sensitive to pressure caused by, for example, a writing instrument, they are typically stored in protective storage envelopes when not in use in order to preserve the reproducibility of the information stored thereon. Warnings and directions relative to proper use of the diskette as well as promotional information are typically printed on the envelope.

Storage envelopes currently on the market typically comprise a rear wall and a front wall joined together at the bottom and two opposite sides to form an open pocket, which is dimensioned to receive the diskette as shown in the drawing. The height of the rear wall may be greater than that of the front wall so that it extends beyond the opening of the pocket, thereby facilitating the easy insertion into and removal from the envelope of the diskette. The depth of the pocket formed by joining the rear and front walls of the protective envelope is usually equal to about ⅔ to ¾ the height of the diskette so that the openings in the diskette jacket, e.g., central hole, index hole, and head access slot, are covered. U.S. Pat. No. 4,473,153 (Colangelo), discloses a somewhat similar protective envelope which further comprises a cover pivotally joined to the top edge of the rear wall. The cover may be pivoted between an open position to allow insertion of the diskette into, and removal from, the envelope and a closed position to enclose the entire diskette within the envelope.

Dust or dirt particles may interfere with the diskette mechanism or read/record apparatus leading to interference with or loss of recorded information, particularly with high density recording media, therefore storage envelopes should preferably be designed to minimize the dirt conditions to which the diskette is subjected. In this regard, storage envelopes should be made from a material generating a low amount of debris. During use, e.g., when slid into and out of the storage envelope, recording diskettes tend to accumulate a static charge on themselves and the envelope, therefore, the storage envelope is preferably made from a material having a rapid static decay rate in order to dissipate accumulated static charges thereby reducing the likelihood of attracting dirt and debris particles. For instance, the envelope should preferably dissipate ninety percent of a 5000 volt charge in a one-half second or less according to the conditions in Method 4046 of Federal Test Method Std. No. 101B. Magnetic recording diskettes are transported, used, and stored throughout ambient temperature and humidity conditions which may range from 50° F. to 140° F. (10° C. to 60° C.) and from nearly 0 percent relative humidity to about 80 percent relative humidity and it is desirable for storage envelopes to retain their shape throughout such conditions, i.e., exhibit dimensional stability, without tending to warp or pillow. Preferably, storage envelopes should be made from a durable sheet material having a tensile strength of about 25.0 pounds per inch width (45.0 Newtons per centimeter width) or more and an Elmendorf Tear value of about 100 grams or more in order to withstand normal wear and tear. It is desirable, both for aesthetic value and for proper operation of automatic insertion equipment, for the storage envelopes to be made from a material having a Taber Stiffness of between about 1 and 7 Taber units.

Storage envelopes for recording diskettes are currently made from a variety of materials as disclosed in U.S. Pat. No. 4,473,153. Examples thereof include coated or uncoated papers, or polymeric materials such as polyvinyls and polyolefins. Insofar as known, no presently used material provides, at the same time, the low level of debris generation, rapid static decay rate, high stiffness and dimensional stability, and easy convertability and printability which is desired for diskette storage envelopes. For instance, although it is a commonly used material, solid bleached sulphate ("SBS") paper, e.g., 8 point clay coated SBS, which is commercially available from a number of manufacturers, has a relatively slow static decay rate and a high rate of debris generation, each of which may lead to interference with or loss of recorded information. Further, this material has poor dimensional stability and is typically adversely affected by high humidity conditions, e.g., storage envelopes made therefrom tend to warp and pillow as the paper absorbs moisture and expands. Another commonly used material, TYVEK, a spunbonded polyethylene available from E.I. duPont de Nemours & Company, is well known for the low level of debris which it generates, but does not provide satisfactory stiffness at economical thicknesses, e.g., it has a Taber Stiffness of only about 0.8 to about 1.4 Taber unit at a thickness of about 7.2 mils (180 microns), and does not have as uniform a surface as desired for optimum printing quality. Further, TYVEK does not have as fast a rate of static decay as is desired to minimize attraction of debris.

SUMMARY OF INVENTION

This invention provides a new composite sheet material for use in storage envelopes for recording media such as magnetic diskettes. The novel composite sheet material generates a surprisingly low level of debris, i.e., through conversion and use, it is substantially lower in debris count than processed sheets made substantially or completely from synthetic fibers, e.g., TYVEK; and has a rapid static decay rate, i.e., requiring less than 0.5, typically less than 0.25, second to dissipate ninety percent of a 5000 volt charge according to Method 4046 of the Federal Test Method Std. No. 101B, thereby avoiding accumulation of dirt particles and reducing the likelihood of data loss or interference. The sheet material of the invention exhibits excellent stiffness and dimensional stability under a variety of ambient temperature and humidity conditions and has a smooth, ink-receptive surface which is easily printed on. Further, it is easily converted to form the desired storage envelopes.

Briefly summarizing, the novel composite sheet material comprises: (A) between about 60 and 90, preferably between about 75 and 85, parts by weight of softwood kraft pulp; (B) between about 5 and 40, preferably between about 15 and 25, parts by weight of synthetic pulp; (C) up to about 10 parts by weight of reinforcing fiber; (D) between about 5 and 25, preferably between about 10 and 15, parts by weight of binder; (E) an effective amount of wet strength agent, typically between about 0.5 and 5, preferably about 2 parts by weight; and F) an effective amount of antistatic agent. If desired, an overcoat of polyvinyl alcohol or carboxy methyl cellulose may be provided to further improve printability of the sheet. Also, if desired, an internal colorant may be incorporated in the composite to achieve desired coloration of the sheet material.

Conveniently, the material may be manufactured using well-known paper-making techniques, and may be produced at a variety of basis weights as desired.

DESCRIPTION OF THE DRAWING

The drawing is a plan view showing a magnetic recording diskette being inserted into a typical storage envelope made from the composite sheet material of present invention.

As seen in the drawing, storage envelope 10 comprises rear wall 12 and front wall 14 which are joined together at bottom 16 and sides 18, 20. Rear wall 12 is higher than front wall 14 to facilitate the insertion and removal of magnetic recording diskette 22. Front wall 14 is generally high enough to provide room to insert diskette 22 deep enough within the envelope to cover openings in the diskette jacket, e.g., central hole 24, stress relief notches 25, index hole 26, and head access slot 27.

DETAILED DESCRIPTION OF THE INVENTION

Sheets of the novel composite material having a caliper of between about 6 mils (150 microns) and 9 mils (230 microns) are typically used for storage envelopes for magnetic recording media. Such sheets typically have a Taber Stiffness of over 4.0, in the machine direction, and over 1.0, in the cross direction; Elmendorf Tear value of over 120 grams in both machine and cross directions; tensile strength of over 36.0 pounds per inch width (63.0 Newtons per centimeter width) in the machine direction, and over 17.5 pounds per inch width (30.5 Newtons per centimeter width) in the cross direction, and will dissipate ninety percent of a 5000 volt static electric charge in less than 0.5, typically less than 0.25, second at a variety of temperatures and humidities. Envelopes made from the composite material have good dimensional stability over the range of humidity and temperature typically encountered during use.

A typical basis weight for composite sheet material to make storage envelopes for magnetic recording diskettes is approximately 70 to 90 pounds (32 to 41 kilograms) per ream, i.e., 480 24-inch-by-36-inch (9.5-centimeter-by-14.0-centimeter) sheets. Other basis weights may be desired for other applications, e.g., lighter envelopes or heavier box constructions for packaging magnetic media.

The major portion of the composite, typically about 60 to 90, preferably between about 75 and 85, parts by weight is wood pulp, preferably comprising fibers having a length between about 3.5 and about 4.0 millimeters and a fiber thickness, i.e., diameter, of between about 20 and about 35 microns. Fibers of the desired dimension are provided by, for example, northern softwoods such as cedar, hemlock, spruce, pine or fir, and typically a blend of such trees, e.g., about 50 weight percent each of cedar and hemlock may be used. Kraft pulps are preferred because such pulps tend to have stronger fibers than other pulps, e.g., mechanical pulps such as groundwood pulps, or sulphite pulps. Composites comprising fibers which are substantially longer than the preferred range tend to be more difficult to form on a paper machine whereas those comprising fibers which are substantially shorter than the preferred range may tend to have lower tear strengths. Fibers which are substantially thicker than the preferred range tend to be less flexible, and not to conform as well resulting in sheets with a coarse, i.e., poor printability and appearance because of higher porosity and lower opacity.

Proportions of wood pulp substantially above 80 parts by weight tend to result in a sheet with greater stiffness, but may result in a sheet having lower opacity and dimensional stability as well as an increased porosity. Sheets having lower proportions of wood pulp tend to have lower stiffness and typically cost more as the remainder of the composite is made up of the typically more expensive, less stiff, synthetic pulps.

The composite also comprises from about 5 to about 40, preferably between about 15 and 25, parts by weight of synthetic pulp having fibers which are between about 0.5 and about 2.5 millimeters long and a fiber thickness of between about 10 and about 40 microns. Useful synthetic pulps include polyolefin fibers such as polyethylenes and polypropylenes, e.g., PULPEX, a polyolefin fiber commercially available from Hercules. Such pulps typically have fine, fibrillated, i.e., branched or brushed out, water dispersible fibers, which, in a pulp slurry, look and act like cellulose. These fibers impart dimensional stability, opacity, and smoothness to the resultant sheet and enable the sheet to be heat-embossed. For example, the melting point of the polyethylene fibers is about 270° F. (132° C.) and with application of heat and pressure to the finished sheet, localized melting of the synthetic pulp fibers occurs resulting in the translucent appearance in those areas of the sheet. Such properties may be used to provide special logos, etc., if desired.

It will typically be desirable to incorporate up to 10 parts by weight of reinforcing fibers in the composite, with about 5 parts by weight thereof being preferred. These fibers reinforce the fiber matrix to impart greater strength, particularly tear strength, to the resultant sheet. Preferred fibers have a fineness of about 1 to about 3, preferably about 1.5, denier, and random cut lengths of from about 0.25 to about 0.38 inches (6 to 10 millimeters). Denier is a unit of fineness based on a standard of 50 milligrams per 450 meters of material. Substantially longer reinforcing fibers tend to produce composite furnishes which are more difficult to form in a conventional wet lay process whereas those substantially shorter than the preferred length do not tend to provide the desired effects. Although increasing proportions of such fibers yield composites with higher tear strength, proportions substantially above 5 parts by weight may tend to lead to a rougher finish.

Reinforcing fibers may be made of such materials as polyolefin, nylon, polyester, rayon, polyamide, or polyvinyl acetate. Rayon and nylon are typically preferred because they provide higher tear strength and are more easily processed in the pulp slurry. Such fibers differ from the synthetic fibers discussed above in that they are stronger and are not normally fibrillated.

To improve the internal bonding of the fiber matrix, particularly of the synthetic fibers and thus impart greater dimensional stability, stretch, and strength to the resultant sheet material, while substantially reducing the debris generation thereof, a binder is incorporated, either by beater addition or by saturation, in the composite. Examples of suitable binders include emulsions of acrylics, acrylonitriles, vinyl acetates, vinyl or vinylidene chlorides, styrene butadienes, or neoprenes, which are compatible with the fiber matrix, i.e., which bond to the wood fibers, synthetic fibers, and reinforcing fibers, and which remain flexible after curing e.g., heat- or air-curing. Typically the composite contains between about 5 and 25, preferably between about 10 and 15, parts by weight of binder to yield a sheet having useful tensile and tear strength, elongation, low debris generation, and high smoothness for printing. Sheets comprising lesser amounts of binder tend to have slightly lower tensile strengths and higher rate of debris generation. Sheets comprising substantially higher amounts of binder latex tend to have increased dimensional stability, but also tend to have lower stiffnesses and tear values.

If desired, an effective amount of a wet strength agent which imparts greater wet strength and dimensional stability to the resultant sheet material, thereby improving its stability under humidity changes and its ability to retain its shape when strained, may be incorporated in the furnish. Such an agent also assists in breaking down the binder emulsion and provides sites for deposition thereof which serves to more uniformly disperse the binder throughout the fiber matrix. Examples thereof include melamine formaldehyde, polyamide-type resins and polyamine-type resins such as polyamine epichlorohydrin, or combinations thereof. Typical amounts range from about 0.5 to about 10 parts by weight with amounts from about 0.5 to about 5.0 parts by weight being preferred. Insufficient amounts result in a sheet which is less dimensionally stable and which tends to pull apart when wet, whereas composites containing excessive amounts tend to be more expensive and those containing very high amounts, i.e., 10 parts by weight or more, may tend to become brittle and crack when folded.

An effective amount of an antistatic agent is incorporated in the composite to increase the conductivity of the resultant sheet, thereby increasing its static decay rate and reducing the likelihood that dirt and debris particles will be picked up. The antistatic agent also gives the resultant sheet a more consistent conductivity over a range of humidity, thereby improving its printability, especially under very dry conditions. Typically, such agents will most efficiently be applied as surface coatings or in a saturant, e.g., the binder, to a formed sheet of the novel composite material, but the antistatic agent may be incorporated in the furnish through beater addition if desired. Examples thereof include quaternary amines, such as Calgon 260 LV available from Calgon Corporation, sodium salts, e.g., sodium nitrate, etc., which can be blended with such viscosity-control agents as carboxy methyl cellulose, polyvinyl alcohol, or combinations thereof in a coating formulation. Such coatings are typically applied at about 0.4 to 2.0 pounds per thousand square yards, with a rate of about 0.8 pound per thousand square yards of composite sheet material typically being preferred. When the antistatic agent is applied as a surface coating it is preferred to incorporate a sizing agent in the composite finish as discussed below.

If desired, an internal sizing agent may be incorporated in the composite. Examples thereof include rosin type sizes such as PEXOL or NEUPHOR 100 which are commercially available from Hercules Co. The internal sizing agent decreases the absorption of the coating liquids into the fiber matrix, resulting in better utilization of the antistatic coating and sharper looking graphics.

An internal colorant such as a dye may be incorporated into the composite to provide a uniquely colored sheet material if desired. For example, at a rate of about 3 pounds per ton of dry fibers (i.e., wood pulp, synthetic pulp and reinforcing fiber), FOAMBLOCK EC Dye, available from Walsh Chemical, results in a gray-colored composite sheet which provides good background coloring for graphics to be printed thereafter. Another suitable dye is FOAMBLOCK JET EC-X4933, an anionic, medium color, aqueous dispersion of carbon black, also available from Walsh Chemical. In general any compatible standard paper dye may be used. It is typically most convenient to add the colorant to the beater furnish.

The composite sheet of the invention can be produced according to well-known paper-making techniques. For example, the kraft pulp may be refined and mixed with the synthetic pulp. After the wet strength agent is mixed in, the binder is added and begins to precipitate onto the fiber matrix. The sizing agent and sufficient alum to bring the pH of the pulp mixture to within the range of about 4.8 to 5.0 are then added before the sheet is formed. Adjustment of pH serves to break down and fully disperse the latex emulsion and to provide a sufficient aluminum ion concentration to improve deposition of the binder and the sizing agent onto the kraft and synthetic fibers.

The novel composite has several properties which make it well suited for use as a storage envelope for recording media. For instance, sheets of the composite of the invention generate a surprisingly low amount of debris, e.g., surface debris, wear debris, and edge debris. Surface debris is generally loose material on the surface of the sheet, such as fibers or pigments associated with clay coatings, whereas wear debris is generated as the envelope is rubbed and abraded during use. Edge debris is typically generated by conversion processes, e.g., die cutting and folding, and printing where the particles created may fall on the surface of the envelope or cling to its edges until rubbed off, e.g., by handling. The level of debris generated by the novel composite is even lower than TYVEK, which is commonly regarded to have a low debris count. It is very surprising for a sheet material such as the composite of the invention which comprises a substantial amount of natural fibers to have a debris count lower than that of a synthetic material such as TYVEK.

A static charge can be generated as a diskette is slid in and out of a protective envelope. Such a charge may cause a transient error directly, or attract dust particles, which in turn can cause either transient or soft errors by read/record apparatus. The composite sheet of the invention has an antistatic coating which imparts a lower surface resistivity to the sheet thereby causing faster dissipation of included static charges and reduction of the amount of dust and dirt particles which are attracted by the diskette.

The composite sheet of the invention is two to three times as stiff as TYVEK at similar thicknesses, e.g., Taber Stiffnesses of 4.1, machine direction, and 1.2, cross direction, at a thickness of 6.4 mil (160 microns) compared to 1.0 and 0.8, respectively, at a thickness of 7.2 mils (180 microns). This increased level of stiffness provides greater protection for the diskette during storage and is typically considered aesthetically desirable by consumers. Also, the greater stiffness of the envelopes of the invention renders more facile their use with both hand and automatic diskette insertion systems.

The tear strength of sheets of the invention, e.g., Elmendorf Tear value of 157 grams, machine direction, and 159, cross direction, at a caliper of 6.4 mils (160 microns) is somewhat less than that of TYVEK but is considered acceptable for use as storage envelopes for recording media.

The smoothness of the novel composite is improved by the presence of synthetic fibers and the polyvinyl alcohol overcoat providing the high overall smoothness desired for printing high quality grahics. The material may be calendared to further increase surface smoothness if desired.

The properties of the novel composite and its suitability for use as a diskette envelope material will be further explained by the following nonlimiting example.

EXAMPLE

The following components were conventionally processed to produce a composite sheet of the invention, all amounts are in parts by weight, unless otherwise specified:

| Component | Amount |
| --- | --- |
| Howe Sound Pulp - a softwood pulp comprising western hemlock and cedar available from Canfor Pulp Sales | 80 |
| PULPEX E - a polyethylene fiber available from Hercules | 20 |
| HYCAR 1562X103 - an acrylonitrile latex emulsion available from B. F. Goodrich | 10 |
| PAREZ 607 - a melamine formaldehyde wet strength agent available from American Cyanamid | 2.5 |
| NEUPHOR 100 - a rosin type sizing agent available from Hercules | 0.2 |
| Antistatic Coating Solution - a 3.5 percent total solids solution in water of Calgon 261 LV and Elvanol 71-30, a polyvinyl alcohol resin available from duPont, (5:1 dry weight ratio). | 1 lb. per 1000 yards$^2$ (.5 kg per 1000 meters$^2$) |

The antistatic coating solution also contained a small amount (about 10 grams per 35 pounds (16 kilograms) of solution) of Leucophor L, a tracing dye visible in ultraviolet light. The resultant sheet was examined under ultraviolet light and found to have been substantially uniformly coated with the antistatic coating solution. The tracing dye is believed to have no effect upon the physical properties of the sheet discussed below.

The sheet was die cut, folded, sealed with adhesive to form protective envelopes of the type shown in the drawing, and then printed with an offset lithrographic press.

Samples of envelopes of the composite sheet material of the invention was compared with samples of printed envelopes made from TYVEK 1059D and 8 point SBS as follows. The average thickness of each material was determined with a caliper, average Taber Stiffness of each was determined according to TAPPI Std. T-489, average Elmendorf Tear value of each was determined according to TAPPI Std. T-414, average tensile strength of each according to TAPPI Std. T-494, and average static decay period of each according to Method 4046 of Federal Test Method Std. No.101B. The results of these tests were tabulated below:

TABLE 1

| Property | Composite | TYVEK 1059D | 8 pt SBS |
| --- | --- | --- | --- |
| Caliper (Mils/Microns) | 6.4/160 | 7.2/180 | 8.8/220 |
| Taber Stiffness | | | |
| MD* | 4.1 | 1.0 | over 10 |
| CD* | 1.2 | 0.8 | over 10 |
| Elmendorf Tear - MD* | 157 | 796 | 157 |
| Value (Grams) CD* | 159 | 520 | 184 |
| Tensile Strength - MD* | 36.1 | 34.2 | 52.2 |
| (Pounds per inch width) CD* | 17.6 | 35.1 | 30.1 |
| Static Decay (Seconds) | | | |
| @ 70° F. and 50% R.H.+ | 0.02 | 0.03 | 0.04 |
| @ 70° F. and 20% R.H.+ | 0.03 | 0.35 | 8.11 |

*MD means machine direction
CD means cross direction
+R.H. means relative humidity These tests show that the composite sheet, the thinnest sheet of the group, while not as stiff as the SBS, was substantially stiffer that TYVEK, especially in the machine direction. Elmendorf Tear and tensile strength values of all three materials were suitable for storage envelopes. The composite had a slightly shorter static decay period to dissipate ninety percent of a 5000 volt charge at 50% relative humidity than did the TYVEK or SBS, and had a substantially shorter period at 20% relative humidity, showing only slight effect with reduced humidity.

The composite of the invention, a sample of TYVEK 1059D, and a sample of 8 pt SBS paper were tested for debris with a Hiac/Royco Model 4150AT Particle Counter and Model 1100 Sensor. Sample envelopes of each material were removed from unused, unopened boxes of envelopes, opened and the inner surface thereof scanned for one minute with a vacuum hose drawing 1.0 cubic feet per minute through the particle counter. The results are tabulated below.

TABLE 2

| Particle Size Range (microns) | Particle Count | | |
| --- | --- | --- | --- |
| | Composite | TYVEK 1059D | 8 pt SBS |
| 0.5-1.5 | 1,600 | 5,410 | 11,100 |
| 1.5-3.0 | 710 | 1,860 | 4,910 |
| 3.0-5.0 | 240 | 80 | 1,550 |
| 5.0-10.0 | 260 | 830 | 1,800 |
| 10.0-15.0 | 270 | 1,560 | 2,670 |
| 15.0+ | 450 | 980 | 2,540 |

The novel composite is seen to be substantially cleaner than either the TYVEK or SBS.

The edges of sample envelopes of all three materials were visually inspected with a 15X microscope. Both the TYVEK and novel sheet were substantially cleaner than the 8 pt SBS.

Samples of envelopes made from the composite paper of the invention and TYVEK 1059D were subjected to different humidity and temperature condition to compare their dimensional stability. A batch of envelopes of each material were tested in the indicated environments to simulate the range of conditions which storage envelopes are exposed during shipping, storage and use. Sample envelopes of each material were allowed to sit for 48 hours at the indicated temperature and humidity whereupon the envelopes were measured across the middle of their openings.

TABLE 3

| Environment | | Opening (16ths of an inch) | | |
|---|---|---|---|---|
| Temp. | R.H. | Composite | TYVEK 1059D | 8 pt SBS |
| 70° F. | 50% | 1 | 1 | 4 |
| 72° F. | 80% | 3 | 2 | 15 |
| 125° F. | 80% | 2 | 4 | 10 |
| 130° F. | 10% | 2 | 5 | 2 |

The composite envelopes were slightly more dimensionallY stable than those made of TYVEK 1059D, and substantially more so than those made of SBS.

The qualities of the printed graphics on envelopes made from each of the three materials, which had all been similarly printed with an offset lithographic press, were compared. Better results were achieved with the composite material than with the TYVEK. Visual inspection revealed that the graphics printed on the composite were sharper and their color more uniform than the graphics printed on the TYVEK samples. The graphics on the SBS appeared to be slightly sharper than those on the composite material. The optical density of the graphics on TYVEK and the composite material were measured with a MacBeth Model TD-504 Transmission Densitometer using #106 Visual Density Filter. Ten envelopes of each material were measured at three points each. The composite envelopes had a mean optical density of 1.23 and standard deviation of 0.03 whereas the TYVEK envelopes had a mean optical density of 1.26 and a standard deviation of 0.16 which confirmed the results of the visual comparison.

Various modifications and alterations of this invention will become apparent to those skilled in the art without departing from the scope and spirit of this invention.

What is claimed is:

1. A composite sheet material which comprises:
   (A) between about 60 and 90 parts by weight of kraft wood pulp, wherein said kraft wood pulp comprises one or a blend of softwood pulps comprising fibers having a length between about 3.5 and about 4.5 millimeters and a thickness between about 20 and about 35 microns;
   (B) between about 5 and 40 parts by weight of one or a blend of synthetic pulps comprising fibers having a length between about 0.5 and about 2.0 millimeters and a thickness between about 10 and 40 microns;
   (C) up to about 10 parts by weight of reinforcing fiber having a fineness between about 1 and about 3 denier and length between about 6 and about 10 millimeters;
   (D) between about 5 and about 25 parts by weight of binder; and
   (E) an effective amount of antistatic agent whereby the static decay rate of said sheet is sufficient to avoid accumulation of particles.

2. A sheet material as defined in claim 1, further comprising an effective amount of a sizing agent.

3. A sheet material as defined in claim 1, wherein said kraft wood pulp comprises at least one of the following pulps: cedar, hemlock spruce, pine, or fir.

4. A sheet material as defined in claim 1, wherein said synthetic pulp is a polyethylene, polypropylene, or combination thereof.

5. A sheet material as defined in claim 1, wherein said reinforcing fiber comprises at least one of the following: polyolefin, nylon, polyester, rayon, polyamide, or polyvinyl acetate.

6. A sheet material as defined in claim 1, wherein said binder comprises at least one of the following: acrylics, acrylonitriles, vinyl acetates, vinyl or vinylidene chlorides, styrene butadienes, or neoprenes.

7. A sheet material as defined in claim 1, further comprising an effective amount of a wet strength agent.

8. A sheet material as defined in claim 7, wherein said wet strength agent is melamine formaldehyde, a polyamide-type resin, a polyamide-type resin, or a combination thereof.

9. A sheet material as defined in claim 1, further comprising an internal colorant.

10. An envelope for storing a magnetic recording medium made from a sheet material as defined in claim 1.

11. A sheet material as defined in claim 1, which comprises:
   (A) between about 75 and 85 parts by weight of said kraft wood pulp;
   (B) between about 15 and 25 parts by weight of said synthetic pulp;
   (C) about 5 parts by weight of said reinforcing fiber; and
   (D) between about 10 and 15 parts by weight of said binder.

12. A sheet material as defined in claim 11, further comprising an internal colorant.

13. A sheet material as defined in claim 1, wherein said sheet material comprises between about 0.4 and about 2.0 pounds of antistatic agent per 1000 square yards of said sheet material.

14. A sheet material as defined in claim 1, wherein said sheet material is between about 6 mils and g mils thick, has: a Taber stiffness of over about 4.0 in the machine direction, and over about 1.0 in the cross direction; an Elmendorf Tear Value of over about 120 grams in both the machine and cross directions; a tensile strength of over about 36.0 pounds per inch width in the machine direction, and over about 17.5 pounds per inch width in the cross direction; and contains a sufficient quantity of antistatic agent such that said sheet has sufficient conductivity to dissipate at least ninety percent of a 5000 volt static electric charge in less than about 0.5 second.

15. A sheet material as defined in claim 14, wherein said sheet has a basis weight of between about 70 pounds and 90 pounds per ream.

* * * * *

UNITED STATES PATENT AND TRADEMARK OFFICE
CERTIFICATE OF CORRECTION

PATENT NO. : 4,774,272

DATED : September 27, 1988

INVENTOR(S) : Craig F. Lamphere, Jeffry S. Shaw, and Leonard R. Swanson

It is certified that error appears in the above-identified patent and that said Letters Patent is hereby corrected as shown below:

Col. 3, line 15, "DESCRIPTION OF THE DRAWING" should be written on one line.

Col. 8, line 58, In Table 2, "80" should read --480--.

Col. 9, line 22, "dimensionallY" should read --dimensionally--.

Col. 10, line 50, "g" should read --9--.

Signed and Sealed this

Seventh Day of February, 1989

*Attest:*

DONALD J. QUIGG

*Attesting Officer*   *Commissioner of Patents and Trademarks*